United States Patent
Kim et al.

(10) Patent No.: US 6,414,735 B1
(45) Date of Patent: Jul. 2, 2002

(54) REFLECTANCE LIQUID CRYSTAL DISPLAY HAVING A LIMITED INTERFERENCE EFFECT

(75) Inventors: Yong Beom Kim, Kunpo-shi; Woo Hyun Kim, Seoul; Hyun Ho Son, Kyungju-shi; Yong Ho Jang, Kwaehon-shi, all of (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/432,658

(22) Filed: Oct. 3, 1999

(30) Foreign Application Priority Data

Dec. 14, 1998 (KR) .............................................. 98-54832

(51) Int. Cl.⁷ ............................................ G02F 1/1335
(52) U.S. Cl. ....................................... 349/113; 349/112
(58) Field of Search .............................. 349/113, 112, 349/201, 202

(56) References Cited

U.S. PATENT DOCUMENTS 4,519,678 A    5/1985  Komatsubara et al.
5,796,455 A  * 8/1998  Mizobata et al. ........... 349/116
6,061,110 A  * 5/2000  Hisatake ..................... 349/113
6,091,469 A  * 7/2000  Naito ......................... 349/113
6,141,073 A  * 10/2000 Sasaki et al. ............... 349/122
6,285,425 B1 * 9/2001  Akins et al. ................ 349/113
6,285,426 B1 * 9/2001  Akins et al. ................ 349/114

OTHER PUBLICATIONS

Ting et al, A high Brightness and High Contrast Reflective LCD with Micro Slant Reflector (MSR), SID 1999.*
Ogawa et al, "The Trends of Reflective LCDs for Future Electronic Paper", SID 1998.*

* cited by examiner

Primary Examiner—Kenneth Parker
(74) Attorney, Agent, or Firm—Birch, Stewart, Kolasch & Birch, LLP

(57) ABSTRACT

A reflectance-type liquid crystal display device includes a first light scattering unit on a first substrate, a reflecting layer having a second light scattering unit on a second substrate, and a liquid crystal layer between the two substrates. One of the two light scattering units defines a regular-directional scattering unit which can easily control the reflectance characteristics, and the other light scatterin unit defines a random-directional scattering unit which prevents the light interference caused by the regular-directional scattering unit.

19 Claims, 5 Drawing Sheets

REFLECTANCE LIQUID CRYSTAL DISPLAY HAVING A LIMITED INTERFERENCE EFFECT

BACKGROUND OF THE INVENTION

1. Field of Invention

The present invention relates to a reflectance-type liquid crystal display apparatus, and more particularly, to a reflectance-type liquid crystal display apparatus having a light scattering device arranged to enlarge the viewing angle range of the user while preventing light interference, decreased light intensity and reflectance and differences in cell gap distance.

2. Description of the Related Art

A liquid crystal display (LCD) apparatus has been widely used as a display for a portable television and a notebook computer. Liquid crystal display apparatuses are classified into two types. One type is a transmitting-type liquid crystal display apparatus using a backlight as a light source. The other type is a reflectance-type liquid crystal display apparatus which uses sunlight or an indoor lamp as an external light source.

It is hard to decrease the weight, the volume, the cost, and the power consumption of the transmitting-type LCD because the backlight is required. Accordingly, a lot of research and development has been conducted relating to reflectance-type LCDs.

Conventionally, the reflectance-type LCD uses a reflector having an uneven reflecting surface on a lower substrate or a light scattering film on an upper substrate, to enlarge the viewing angle of the user.

The light scattering film scatters the incident light in arbitrary directions to increase a viewing range of the user. However, when using the light scattering film, it is difficult to control the reflectance characteristics such as the reflectance luminance in a certain direction.

On the other hand, when using the reflector having the uneven reflecting surface, it is easy to control the reflectance characteristics by using an uneven reflecting surface having convex and concave portions which are regularly arranged, but light interference is caused by the regular reflection of light as shown in FIG. 1 which illustrates the reflectance I with respect to the viewing angle θ of the user.

Further, if an uneven reflecting surface having convex and concave portions which are randomly arranged is used to prevent the light interference, a uniform reflectance cannot be obtained in the main viewing angle range of the user. As seen in FIG. 2, a high reflectance in a region A is caused by light reflected by parallel portions of the uneven reflecting surface with respect to the substrates, and a low reflectance in a region B is caused by light reflected by oblique portions of the uneven reflecting surface with respect to the substrates. Furthermore, when using an uneven reflecting surface having convex and concave portions which are randomly arranged, it is also difficult to control the reflectance characteristics as when using the scattering film, the cell gap is not uniform because of the uneven reflecting surface, and uniform alignment cannot be achieved by rubbing because the rubbed alignment layer has an uneven surface like the uneven reflecting surface.

SUMMARY OF THE INVENTION

To overcome the problems described above, preferred embodiments of the present invention provide a reflectance-type liquid crystal display apparatus which achieves a very wide viewing angle range of the user and is arranged to easily and accurately control the reflectance characteristic while preventing light interference, decreased light intensity and reflectance and differences in cell gap distance.

A reflectance-type liquid crystal display apparatus according to a preferred embodiment of the present invention includes first and second substrates, a light scattering unit on the first substrate, an uneven layer on the second substrate, the uneven layer having an uneven surface, a reflecting layer disposed along the uneven surface, and a liquid crystal layer between the first and second substrates.

According to preferred embodiments of the present invention, the apparatus can be constructed such that the light scattering unit has a plurality of light scattering sources arranged substantially randomly, and the uneven surface preferably has a plurality of convex and concave portions arranged substantially regularly. The reflecting layer having the uneven surface reflects and scatters light in regular directions, and thereby, a desired reflectance characteristic can be easily obtained by controlling the regular arrangement of the uneven surface. The light scattering unit scatters light in random directions to prevent light interference caused by the light reflection in regular directions.

According to another preferred embodiment of the present invention, the light scattering unit preferably includes a plurality of light scattering sources arranged substantially regularly, and the uneven surface has a plurality of convex and concave portions arranged substantially randomly. The light scattering unit scatters light in regular directions, and thereby a desired reflectance characteristic can be easily obtained by controlling the regular arrangement of the light scattering sources. The reflecting layer having the uneven surface scatters light in random directions to prevent light interference caused by the light scattering in regular direction.

Other features, advantages and elements of the present invention will be described in more detail below with reference to the attached drawings.

DETAILED DESCRIPTION OF PREFERRED EMBODIMENTS

Figure 1:
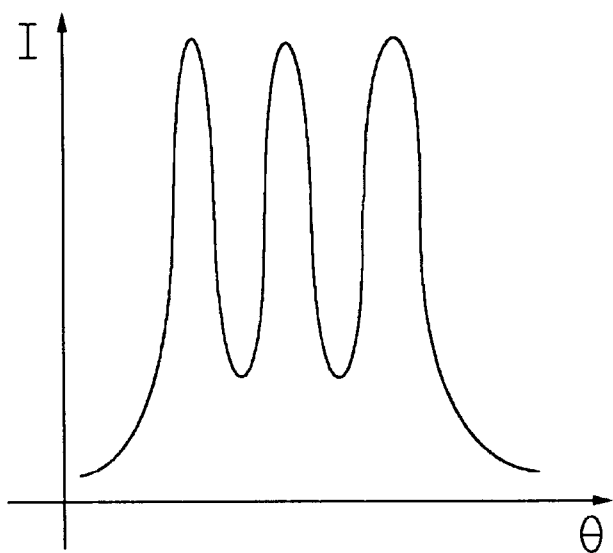
FIG. 1 is a graph of reflectance I relative to the viewing angle θ of an uneven reflecting surface having convex and concave portions which are regularly arranged in a conventional apparatus.
Figure 2:
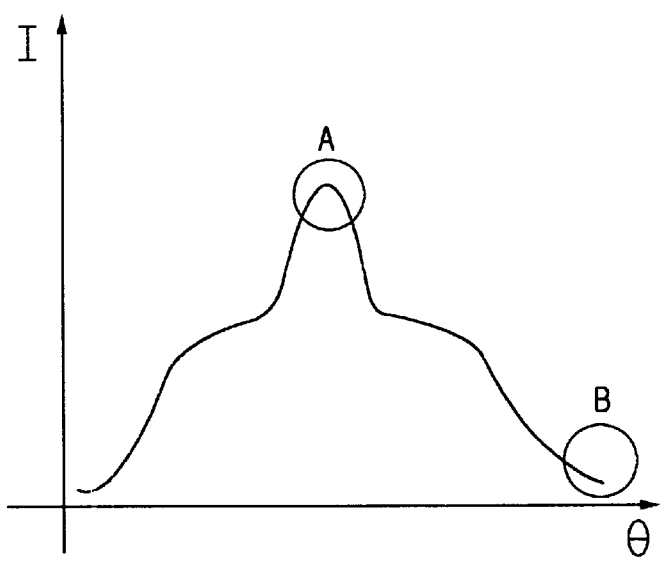
FIG. 2 is a graph illustrating reflectance I relative to the viewing angle θ of an uneven reflecting surface having convex and concave portions which are randomly arranged in a conventional apparatus.

Hereinafter, various preferred embodiments of a reflectance-type LCD according to the present invention are described in detail referring to the drawings.

Figure 3A:
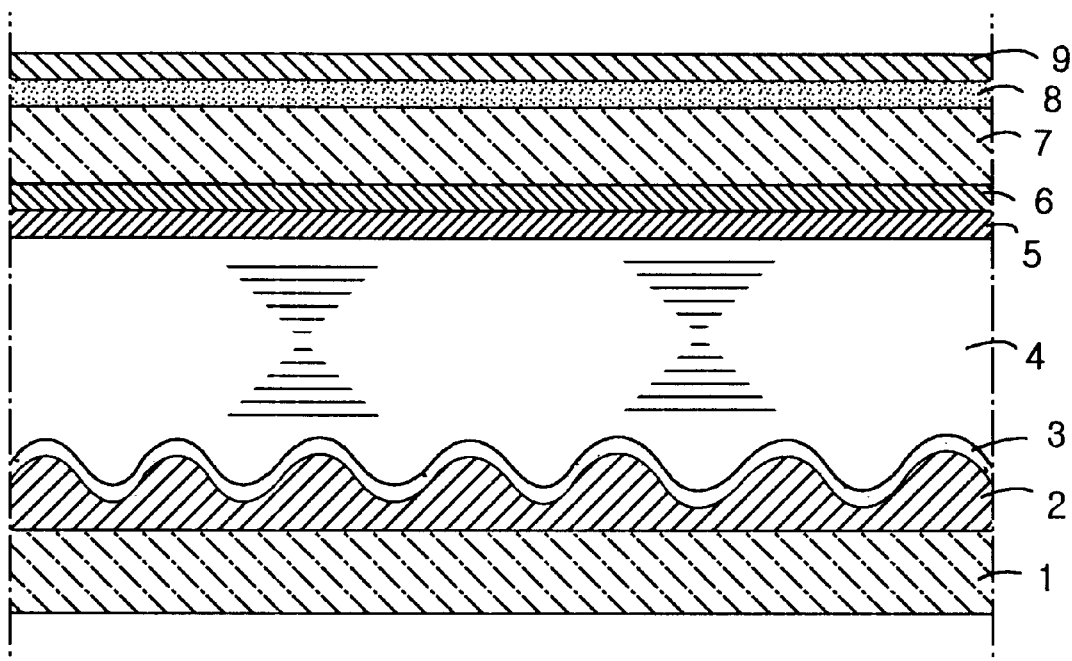
FIG. 3a is a sectional view showing a reflectance-type LCD according to a first preferred embodiment of the present invention.

As shown in FIG. 3a, a reflectance-type LCD apparatus according to a preferred embodiment of the present invention preferably includes a first substrate 7 and a second substrate 1, a scattering film 8 on an outer surface of the first substrate 7, a polarizer 9 on the scattering film 8, a color filter layer 6 on an inner surface of the first substrate 7, a transparent electrode 5 on the color filter 6, an uneven insulating layer 2 on an inner surface of the second substrate 1 and having an uneven surface with regularly arranged uneven portions, a reflecting layer 3 on the uneven surface of the uneven layer 2, and a liquid crystal layer 4 between the first substrate 7 and the second substrate 1.

A transparent substrate such as a glass substrate is preferably used for the first substrate 7. A transparent substrate such as a glass substrate or an opaque substrate can be used for the second substrate 1.

The scattering film 8 is preferably formed by coating on the substrate 7 a transparent resin layer including a plurality of transparent granules each with a refractive index higher than that of the resin. Light passing through the scattering film 8 is scattered by the transparent granules, and because the transparent granules are arranged randomly, the light is scattered in random directions. Although not illustrated in the figure, the apparatus of preferred embodiments of the present invention may further comprise a $4/\lambda$ phase retardation film between the polarizer 9 and the scattering film 8, when the apparatus operates in normally black mode. The transparent electrode 5 is preferably made of transparent conducting material such as ITO (Indium Tin Oxide) or other suitable material.

Figure 3B:
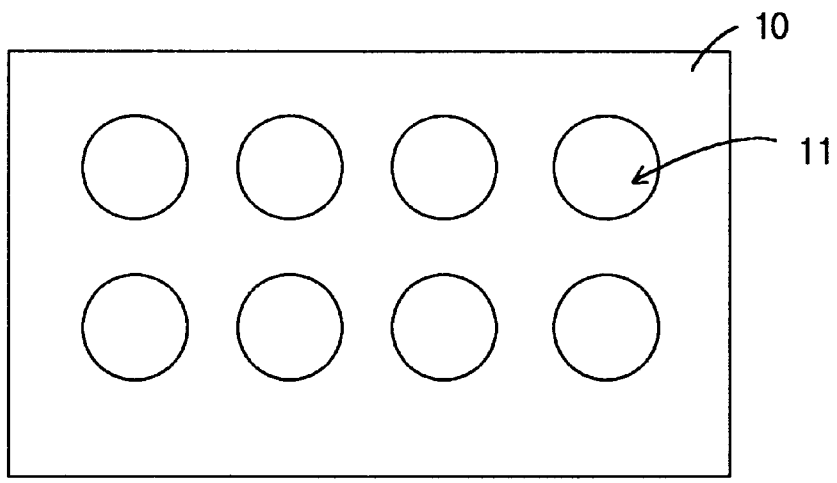
FIG. 3b is a plane view showing a mask used for forming an uneven insulating layer of the first preferred embodiment of the present invention.

The uneven surface of the uneven insulating layer 2 has a plurality of convex and concave portions which are regularly arranged, and the uneven insulating layer 2 is preferably formed by the following process. First, a photosensitive resin layer is coated on the second substrate 1, and then UV light is irradiated onto the photosensitive resin layer while using a mask 10 as shown in FIG. 3b to block the photosensitive resin layer, and the photosensitive resin layer is partially developed and heated to form the uneven insulating layer 2.

The mask 10 has a plurality of light shielding portions 11. The light shielding portions 11 preferably have similar shapes, sizes and are arranged at regular intervals.

In order for the photosensitive resin layer to be partially developed, positive photosensitive resin having a low resolution is used for the photosensitive resin layer, and the irradiation time, developing time, and curing temperature are controlled so as to not entirely etch the concave portions of the uneven insulating layer 2. Each width or diameter of the light shielding portions is preferably within a range of about 2 $\mu$m to about 20 $\mu$m, and a distance between each center of adjacent light shielding portions is preferably within a range of about 2 $\mu$m to about 40 $\mu$m. The light shielding portions may have any shape such as substantially oval, substantially rectangular, and stripe-shaped so long as the light shielding portions are regularly arranged or have a regular configuration, such as the shape or size.

When using negative photosensitive resin as the material for the uneven insulating layer, a mask having a plurality of opening portions corresponding to the light shielding portions 11 is preferably used.

The uneven insulating layer may have any other structures as long as it has the uneven surface having convex and concave portions are regularly arranged. For example, another type of uneven insulating layer may be formed by the following process. First, a plurality of bumps having a regular arrangement are formed on the second substrate 1 by coating, patterning and heating a photosensitive resin layer on the second substrate 1, and then an overcoat layer is coated on the bumps. This overcoat layer has the uneven surface having convex and concave portions which are regularly arranged, similar to the uneven insulating layer 2.

Although not illustrated in the figure, before forming the uneven insulating layer 2, a plurality of data and gate bus lines are formed on the second substrate 1, defining a plurality of pixel regions, and a transistor defining a switching element is formed in each pixel region. The transistor preferably includes a gate electrode, a gate insulator, a semiconductor layer, a source electrode, and a drain electrode.

The reflecting layer 3 is preferably formed by depositing a metal such as Al on the uneven insulating layer 2 preferably via a sputtering method, and patterning the deposited metal layer preferably via a photolithography method so that the reflecting layer is formed in each of the pixel regions to be connected to the drain electrode. The reflecting layer 3 is formed along the uneven surface in a regular configuration to scatter the incident light in regular directions. Further, the reflecting layer 3 is connected to the corresponding drain electrode to define a pixel electrode which applies an electric field to the liquid crystal layer 4 in cooperation with the transparent electrode 5.

The first preferred embodiment of the present invention operates as follows.

First, incident light from an external light source is linearly polarized by the polarizer 9, and then scattered in random directions by the scattering film 8. The scattered light passes through the first substrate 7, the color filter layer 6, the transparent electrode 5, and the liquid crystal layer 4 in this order, and then the scattered light is reflected on the reflecting layer 3, when the reflected light is scattered in regular directions by the uneven surface of the reflecting layer 3 having the regular configuration. Although the reflected light is scattered in regular directions, light interference is not caused because the light is already scattered in random directions by the scattering film 8. The reflected and scattered light passes the liquid crystal layer 4, the transparent electrode 5, the color filter layer 6, and the first substrate 7 in this order. Thereafter, the light is scattered in random directions by the scattering film 8, and then after passing the polarizer 9, the light reaches eyes of the user.

Figure 4:
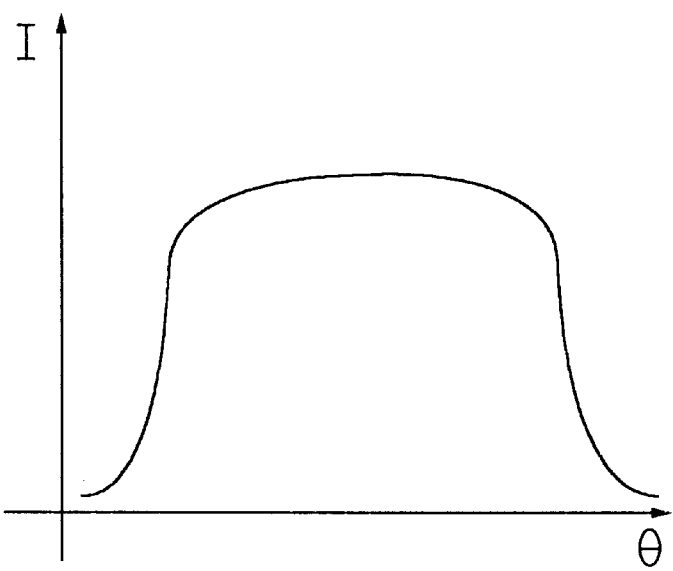
FIG. 4 is a graph illustrating reflectance I relative to the viewing angle θ in preferred embodiments of the present invention.

In this preferred embodiment, light interference is not caused as shown in FIG. 4, even though the reflecting layer 3 has an uneven reflecting surface arranged to have a regular configuration. Further, a uniform reflectance can be obtained in the main viewing angle range of the user by controlling the regular form or arrangement of the uneven reflecting surface. Furthermore, a predetermined reflectance can be obtained at a predetermined viewing angle by controlling the regular form or arrangement of the uneven reflecting surface. For example, when the uneven reflecting surface is formed by using a mask having opening portions with a substantially elliptic shape extending in the left-right viewing direction of the user, high reflectance is obtained in the up-down viewing angle range. In addition, the cell gap and the alignment direction of this preferred embodiment are much more uniform than the prior art using the uneven reflecting surface having a random configuration.

Figure 5:
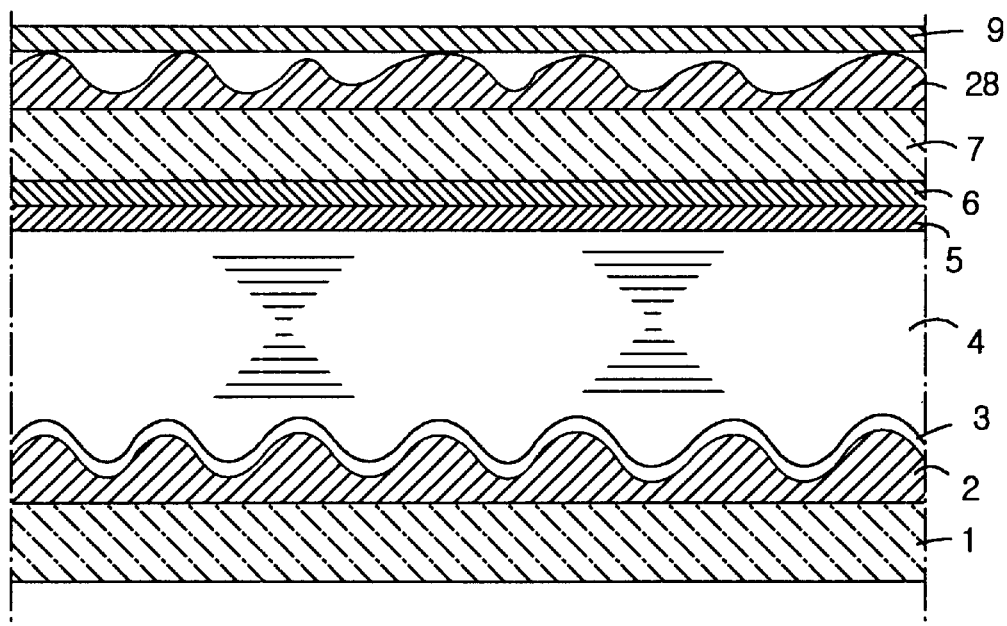
FIG. 5 is a sectional view showing a reflectance-type LCD according to a second preferred embodiment of the present invention.

FIG. 5 is a sectional view showing a second preferred embodiment, where the same portions as the first preferred embodiment are not explained in detail but are represented by the same reference numerals.

Figure 6:
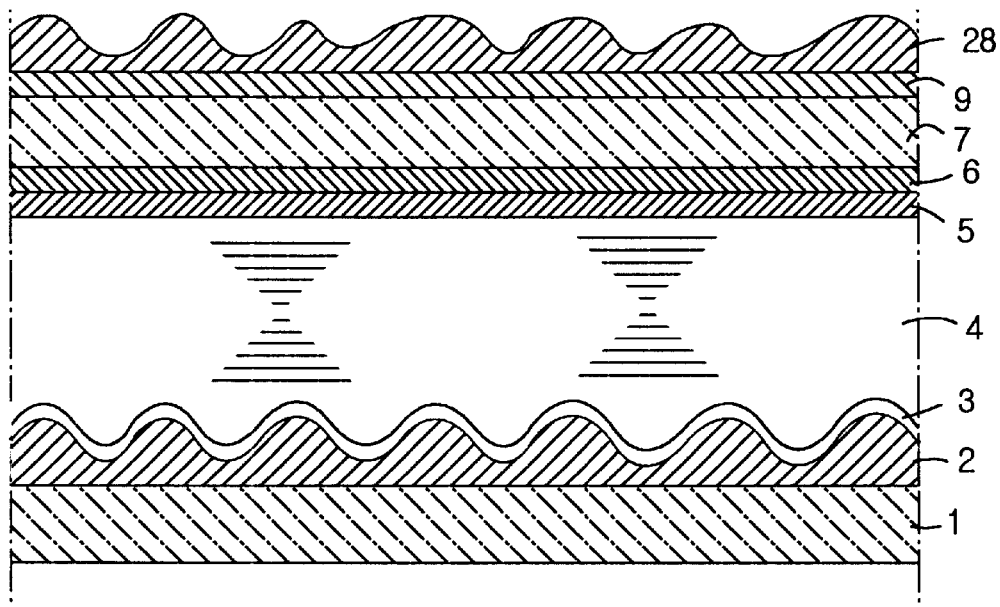
FIG. 6 is a sectional view showing another reflectance-type LCD according to the second preferred embodiment of the present invention.

As shown in FIG. 5, the second preferred embodiment is different from the first preferred embodiment in that a transparent uneven layer 28 having an uneven surface with a random form or arrangement is provided between the polarizer 9 and the first substrate 7, instead of the scattering film. The transparent uneven layer 28 has an uneven surface having a plurality of convex and concave portions randomly arranged. Therefore, the transparent uneven layer 28 scatters the incident light in random directions, similar to the scattering film 8 of the first preferred embodiment. The transparent uneven layer 28 is preferably formed by the same process as the uneven insulating layer 2 except that the process uses a mask having light shielding or opening portions configured in a random arrangement or form. A plurality of transparent bumps having a random arrangement or random forms may be substituted for the transparent uneven layer 28. Further, the transparent uneven layer 28 can be formed on an outer surface of the polarizer 9 as shown in FIG. 6.

The uneven insulating layer 2 may have convex and concave portions in any form or arrangement as long as the convex and concave portions have regular forms or regular arrangement. For example, preferred embodiments of the present invention can be applied to the case where the convex and concave portions have the same form or the same arrangement in each of the pixel regions, for example, they have the same size, the same shape, and the same interval in each of the pixel regions, but the convex and concave portions in at least two pixel regions have a different form or arrangement as compared to each of the two pixel regions.

Figure 7:
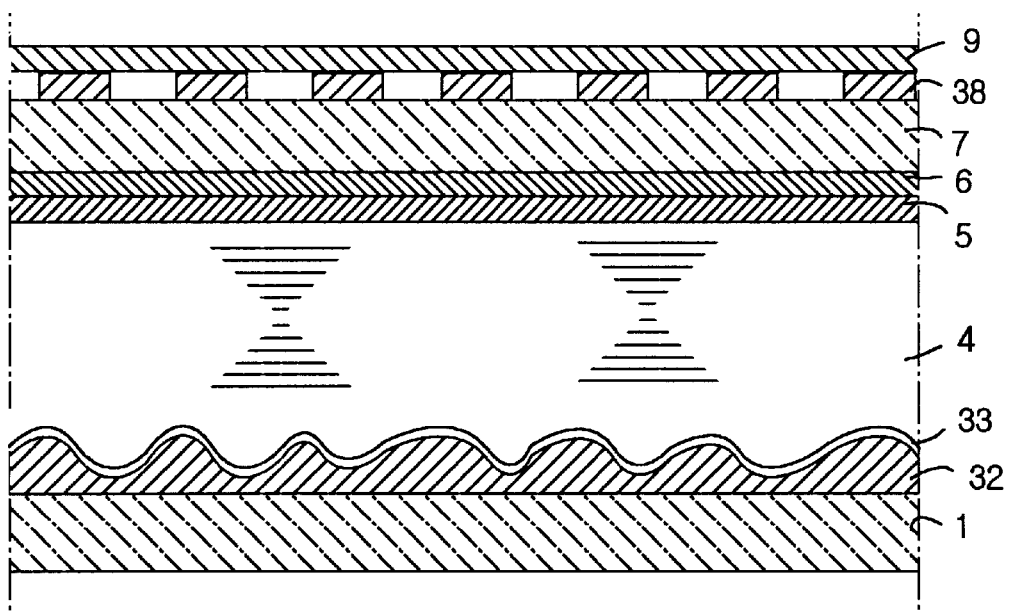
FIG. 7 is a sectional view showing a reflectance-type LCD according to a third preferred embodiment of the present invention.

FIG. 7 is a sectional view showing a third preferred embodiment, where the same portions as the first preferred embodiment are not explained in detail but they are represented by the same reference numerals. As shown in FIG. 7, the scattering film 8 and the uneven insulating layer 2 are not included in this preferred embodiment, which is different from the first preferred embodiment. Instead, a plurality of transparent bumps 38 having a regular form or arrangement are provided between the polarizer 9 and the first substrate 7, and an uneven insulating layer 32 having an uneven surface with a random form or arrangement is provided between the second substrate 1 and the metal layer 33.

The transparent bumps 38 having a substantially cuboid form are preferably formed by the following process. First, a photosensitive resin layer is coated on the first substrate 7, and then UV light is irradiated onto the photosensitive resin layer using a mask 10 which has light shielding or opening portions with substantially rectangular form and being regularly arranged. Thereafter, the irradiated photosensitive resin layer is developed to form the transparent bumps. Thereafter, heat treating can be performed to round the surface of the transparent bumps 38.

The transparent bumps 38 scatter light in regular directions. In this preferred embodiment, the bumps 38 can be replaced by an uneven and transparent insulating layer having an uneven surface having a plurality of convex and concave portions with regular form or arrangement. The uneven and transparent insulating layer is preferably formed using the same process as that used to form the uneven insulating layer 2 of the first preferred embodiment.

Figure 8:
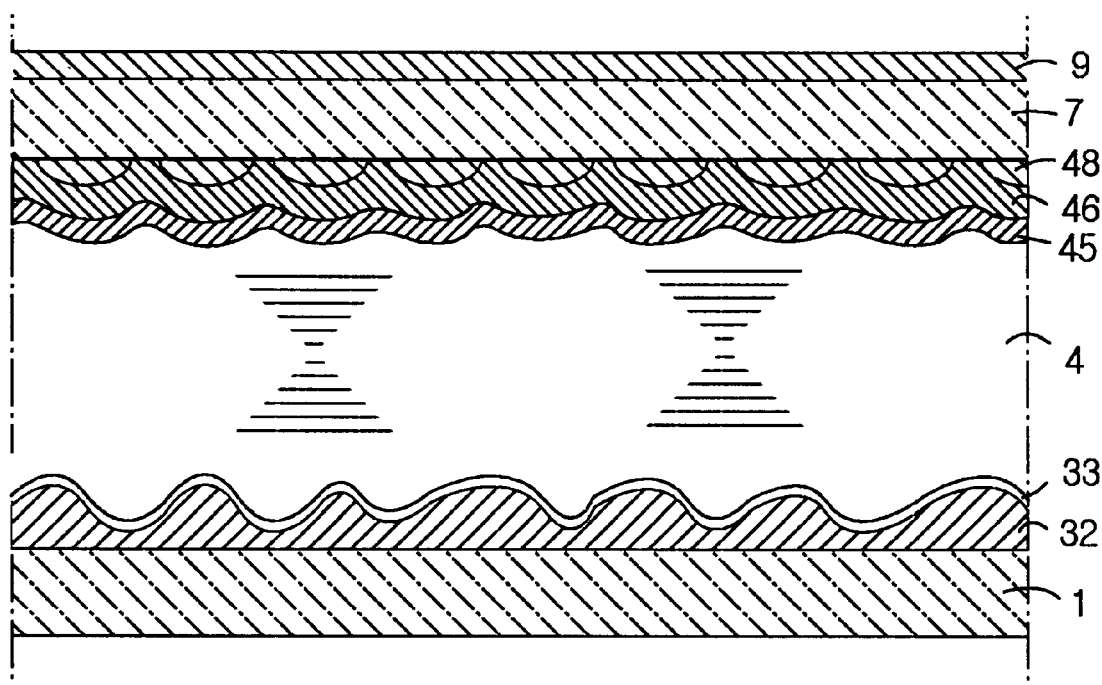
FIG. 8 is a sectional view showing a reflectance-type LCD according to a fourth preferred embodiment of the present invention.

FIG. 8 is a sectional view showing a fourth preferred embodiment, where the same portions as the third preferred embodiment are not explained in detail but they are represented by the same reference numerals.

As shown in FIG. 8, instead of the bumps 38 of the third preferred embodiment, a plurality of transparent and substantially round bumps 48 having regular form or arrangement are provided between the first substrate 7 and the color filter layer 46. An organic layer may be coated on the transparent and substantialy round bumps 48 so as to flatten the surface. The transparent and substantially round bumps 48 may be provided between the transparent electrode 45 and the color filter layer 46, or they may be provided on an inner surface of the transparent electrode 45.

In the third and fourth preferred embodiments, the transparent bumps 38 and 48, or the uneven and transparent insulating layer provided on the first substrate 7 may have convex or concave portions with any form or arrangement as long as the convex or concave portions have a regular form or arrangement.

For example, the present invention can be applied to the case where the convex or concave portions have the same form or arrangement in each of the pixel regions, for example, they have the same size, the same shape, and the same interval in each of the pixel regions, but the convex or concave portions in at least two pixel regions have different forms or arrangements as compared to each of the two pixel regions.

The reflectance-type LCDs according to at least one of the preferred embodiments of the present invention preferably have a first light scattering unit on a first substrate, and a reflecting layer having a second light scattering unit on a second substrate. One of the two light scattering units defines a regular-directional scattering unit which can easily control the reflectance characteristics, and the other light scattering unit defines a random-directional scattering unit which prevents the light interference caused by the regular-directional scattering unit.

While preferred emobidiments of the present invention have been described, it is to be understood that modifications will be apparent to those skilled in the art without departing from the spirit of the invention. Therefore, the scope of the invention is to be determined solely by the following claims.

What is claimed is:

1. A reflectance liquid crystal display apparatus comprising:
   a first substrate;
   a second substrate;
   a light scattering unit on the first substrate;
   an uneven layer on the second substrate, the uneven layer having an uneven surface;
   a reflecting layer extending along the uneven surface of the uneven layer; and
   a liquid crystal layer between the first and second substrates,
wherein the light scattering unit includes a plurality of light scattering sources arranged substantially randomly, and the uneven surface has a plurality of convex and concave portions arranged substantially regularly, and the plurality of convex and concave portions arranged substantially regularly causes an interference effect which is limited by the plurality of light scattering sources arranged substantially randomly.

2. The apparatus according to claim 1, further comprising a polarizer between the first substrate and the light scattering unit.

3. The apparatus according to claim 1, wherein the light scattering unit includes a resin layer having a plurality of transparent granules arranged substantially randomly.

4. The apparatus according to claim 1, wherein the light scattering unit includes at least two transparent convex portions, each of the at least two transparent convex portions having a different size and form.

5. The apparatus according to claim 1, wherein the light scattering unit includes a plurality of transparent convex portions arranged substantially randomly.

6. The apparatus according to claim 1, wherein the light scattering unit includes an uneven layer having a plurality of convex and concave portions arranged substantially randomly.

7. The apparatus according to claim 4, wherein at least one of the convex portions has an outer peripheral shape that is at one of substantially circular, substantially oval, substantially rectangular, and stripe-shaped.

8. The apparatus according to claim 5, wherein at least one of the convex portions has an outer peripheral shape that is at one of substantially circular, substantially oval, substantially rectangular, and stripe-shaped.

9. The apparatus according to claim 6, wherein at least one of the convex portions has an outer peripheral shape that is at one of substantially circular, substantially oval, substantially rectangular, and stripe-shaped.

10. The apparatus according to claim 1, wherein the second substrate is divided into a plurality of pixel regions, the uneven surface has a plurality of convex and concave portions which have substantially the same form as each of the pixel regions, and the convex and concave portions have random arrangement.

11. A reflectance liquid crystal display apparatus comprising:
   a first substrate;
   a second substrate;
   a light scattering unit on the first substrate;
   an uneven layer on the second substrate, the uneven layer having an uneven surface;
   a reflecting layer extending along the uneven surface of the uneven layer; and
   a liquid crystal layer between the first and second substrates,
wherein the light scattering unit includes a plurality of light scattering sources arranged substantially regularly, and the uneven surface has a plurality of convex and concave portions arranged substantially randomly, and the plurality of light scattering sources arranged substantially regularly causes an interference effect which is limited by the plurality of convex and concave portions arranged substantially randomly.

12. The apparatus according to claim 11, wherein the light scattering unitincludes a plurality of transparent convex portions having the same form.

13. The apparatus according to claim 11, wherein the light scattering unit includes a plurality of transparent convex portions arranged substantially regularly.

14. The apparatus according to claim 11, wherein the light scattering unit includes an uneven layer having a plurality of convex and concave portions arranged substantially regularly.

15. The apparatus according to claim 12, wherein at least one of the convex portions has an outer peripheral shape that is at one of substantially circular, substantially oval, substantially rectangular, and stripe-shaped.

16. The apparatus according to claim 13, wherein at least one of the convex portions has an outer peripheral shape that is at one of substantially circular, substantially oval, substantially rectangular, and stripe-shaped.

17. The apparatus according to claim 14, wherein at least one of the convex portions has an outer peripheral shape that is one of substantially circular, substantially oval, substantially rectangular, or stripe-shaped.

18. The apparatus according to claim 11, wherein the first substrate is divided into a plurality of pixel regions, the light scattering unit has a plurality of convex portions having the same form in each of the pixel regions, and the convex portions have random arrangement.

19. A reflectance-type liquid crystal display apparatus, comprising:
   first and second substrates sandwiching a liquid crystal layer there between;
   a first light scattering unit on the first substrate;
   a reflecting layer on the second substrate, the reflecting layer having a second light scattering unit, and
wherein one of the first and second light scattering units has a plurality of light scattering sources arranged randomly, and the other of the first and second light scattering units has a plurality of light scattering sources arranged regularly, and the light scattering sources arranged regularly causes an interference effect that is limited by the plurality of light scattering sources arranged randomly.

* * * * *